Patented Aug. 11, 1942

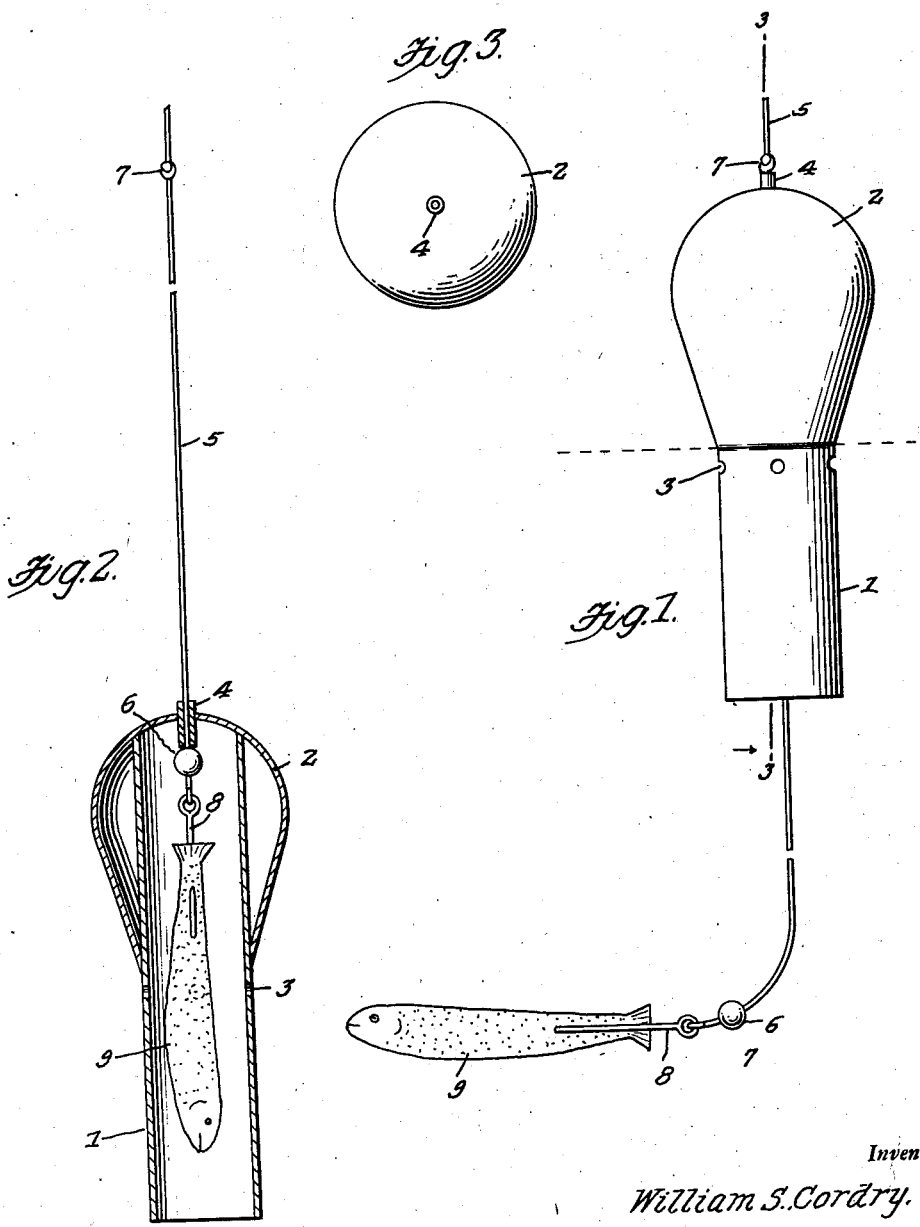

2,292,743

UNITED STATES PATENT OFFICE 2,292,743

BAIT CASTING GUARD

William S. Cordry, St. Louis, Mo.

Application June 10, 1941, Serial No. 397,465

3 Claims. (Cl. 43—27)

This invention relates to a guard for casting live bait, the general object of the invention being to provide a cylinder having a float at its top for holding the device at the top of a body of water with the line passing through the device and the live bait on the hook remaining in the cylinder during the casting operation, with the minnow and hook sinking into the water from the cylinder when the device is floating on the water. Thus the device will protect the minnow so that one minnow can be used with a large number of casts and the device will prevent snagging of the hook in brush or the like.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which—

Figure 1 is a view showing the invention in use on a fishing line with the device floating on the water and the minnow on the hook having passed from the device with the parts in fishing position.

Figure 2 is a longitudinal sectional view through the device and showing the minnow therein.

Figure 3 is a top plan view.

In these views the numeral 1 indicates a cylinder of elongated form and this cylinder is preferably formed of Celluloid or the like and is transparent. A bulbous member 2 covers the upper portion of the device and the space between this member 2 and the upper part of the cylinder 1 forms an air chamber which makes the device buoyant in water as shown in Figure 1. Holes 3 are formed in the cylinder below the junction of the member 2 therewith and this part 2 can be made translucent. A small sleeve 4 passes through a hole in the top of the member 2 and extends into the upper part of the cylinder and the fishing line 5 passes through this sleeve. The weight 6 on the lower part of the line prevents the line from passing through the sleeve and a knot 7 is formed in the line to limit upward movement of the device on the line and this knot regulates the depth the hook 8 with the minnow 9 thereon rests in the water so that by placing this knot in the proper position in the line the depth of fishing can be regulated. As will be seen when the casting is being done the minnow and the hook are located in the cylinder thus protecting the minnow so that a great number of casts can be made without renewing the bait and as soon as the device strikes the water it will float in an upright position thereon as shown in Figure 1 and the weight of the sinker or weight 6 and of the hook will cause the line to pass downwardly until the knot 7 engages the upper end of the sleeve 4 and then the minnow will be at a predetermined depth in the water so that a fish can strike the same.

As before stated this device will protect the minnow and enables the same bait to be used over and over again enabling a large number of casts and it will also prevent the hook from being caught in brush and other obstructions.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a bait protecting device for a fishing line, an elongated cylinder, a bulbous member enclosing the upper portion of the cylinder and forming a float chamber, a sleeve in the top of the bulbous member and extending into the upper part of the cylinder, the line passing through the sleeve with the hook and the bait resting in the cylinder with the hook and bait passing from the cylinder when the device is resting on the water.

2. In a bait protecting device for a fishing line, an elongated cylinder, a bulbous member enclosing the upper portion of the cylinder and forming a float chamber, a sleeve in the top of the bulbous member and extending into the upper part of the cylinder, the line passing through the sleeve with the hook and the bait resting in the cylinder with the hook and bait passing from the cylinder when the device is resting on the water, the cylinder having holes therein below the junction of the bulbous therewith and stops on the line for limiting upward and downward movement of the device upon the line.

3. A bait protecting device for a fishing line comprising an elongated hollow body having its top closed, guide means in said closed top through which the line passes for sliding movement, the body being of a size to receive the sinker, hook and bait of the line and of a weight to cause the body to move downwardly on the line until the guide means engages the sinker when the body comes to rest with the hook and bait therein and a float surrounding the upper end of the body for holding the body in upright position in a body of water.

WILLIAM S. CORDY.